(No Model.)

S. SCHMAUS.
KNOB ATTACHMENT.

No. 403,222. Patented May 14, 1889.

Witnesses:
Wm O Stark
F. Gingras

Inventor:
Simon Schmaus,
by Michael J Stark,
Attorney.

UNITED STATES PATENT OFFICE.

SIMON SCHMAUS, OF BUFFALO, NEW YORK.

KNOB ATTACHMENT.

SPECIFICATION forming part of Letters Patent No. 403,222, dated May 14, 1889.

Application filed January 26, 1889. Serial No. 297,730. (No model.)

*To all whom it may concern:*

Be it known that I, SIMON SCHMAUS, of Buffalo, in the county of Erie and State of New York, have invented certain new and useful Improvements in Door-Knob Fasteners; and I do hereby declare that the following description of my said invention, taken in connection with the accompanying sheet of drawings, forms a full, clear, and exact specification, which will enable others skilled in the art to which it appertains to make and use the same.

This invention has general reference to improvements in door-knob fasteners; and it consists, essentially, in the novel and peculiar combination of parts and details of construction, as hereinafter first fully set forth and described, and then pointed out in the claims.

Figure 1:
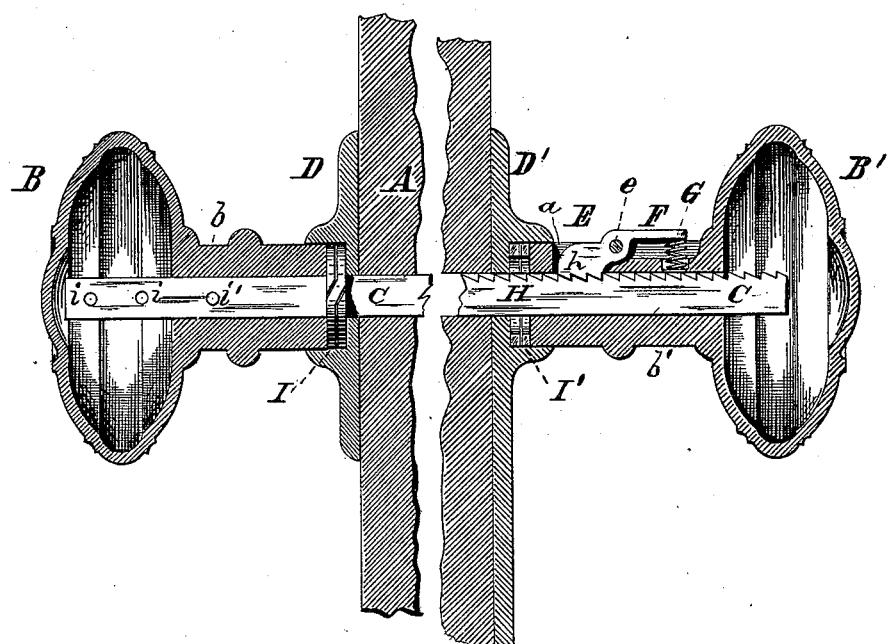
Figure 3:
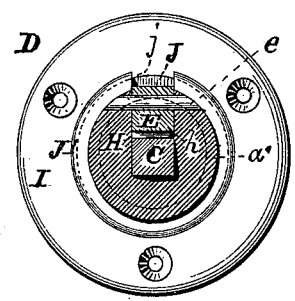
Figure 2:
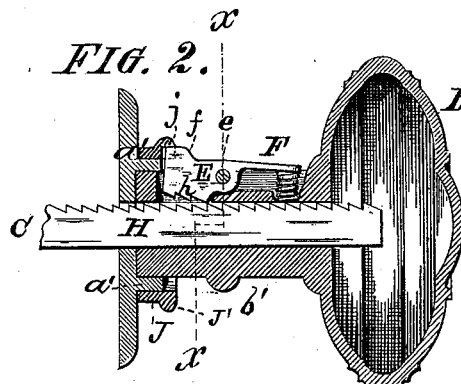
Figure 4:
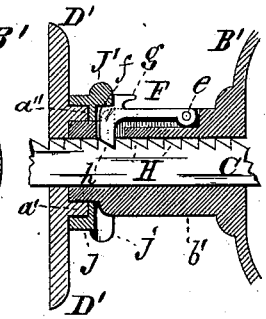

In the drawings already referred to, which serve to illustrate my said invention more fully, Figure 1 is a transverse sectional elevation of a pair of door-knobs constructed in accordance with my invention. Fig. 2 is a similar view of one of the knobs detached. Fig. 3 is a transverse sectional elevation in line *x x* of Fig. 2. Fig. 4 is a longitudinal sectional elevation showing a modification of my device.

Like parts are designated by corresponding letters of reference in all the figures.

The object of this invention is the production of an efficient device for securing the door-knobs to their spindles. To accomplish this result, I construct the knobs B B' with the shanks *b b'*, having in their center the usual angular aperture for the passage of the square spindle C, said shank operating in the door-plates D D' in the usual manner. The knob B does not differ in construction from those now in use, except that, instead of fastening it to the spindle by a screw, I secure it by a pin, *i'*, there being a series of holes, *i*, in said spindle, one of which engages the said pin *i'* in a manner easily comprehended. The knob B' differs from those now made in having in the shank *b'* a recess, *a*, into which is placed a dog, E, pivoted at *e*, and provided with a thumb-piece, F, for depressing the said dog and thereby to disengage the serrated portion *h* of the same from notches H in the spindle C. A spiral spring, G, interposed between the thumb-piece F and the bottom of the recess *a*, pushes the thumb-piece upward and thereby keeps the teeth *h* in contact with the teeth H.

In order to prevent lateral motion of the knobs in the plates D D' and at the same time to allow the dog to catch in the serrations in the spindle, I locate spring-washers I I' in the said plates, such washers consisting, as shown, of split rings of the usual construction, though ordinary coil-springs will answer perfectly, should these be preferred.

In operation the thumb-piece F is depressed, as illustrated in Fig. 2, when the knob B' may be passed upon the spindle C until the end of the shank *b'* compresses the springs I I', when the teeth *h* of the dog will engage the nearest notches H in the spindle C, it being understood that the elasticity of the springs admits of a certain amount of adjustment in this respect should the teeth not be exactly in mesh when the knob reaches the spring.

The device heretofore described adds but a trifle to the cost of the door-knobs, if any, but forms a ready means of making adjustment to fit any door, A, of the usual thickness, and for removing the knobs and spindle when desired.

In applying the knobs I prefer to upset the pin *i'* in the shank of the knob B to prevent its ready removal and to place this knob outside and the knob B' inside of the room or door in connection with which it is to be used.

It will be readily observed that the mechanism for fastening the knob to the spindle can be applied to all the different kinds of knobs now made by affixing such knobs to my shanks *b b'* in manners readily suggesting themselves to the manufacturer of this class of builders' hardware.

In the device heretofore described the thumb-piece of the dog E is liable to be depressed when the knob B' is taken hold of, and thereby liable to be disengaged and pulled off from the spindle. To avoid this objection, I construct the door-plate B' with a central projecting ring, *a'*, Figs. 2, 3, and 4, and place upon the same a movable collar, J, having a notch, *j*, as shown. In the dog E, I provide a projection, *f*, and so arrange the same that when the dog engages the serrated spindle the top surface of said projection is even with the outside or periphery of said annular projection *a'*. Thus, when the collar J is revolved and the notch $j$ in a downward position, as shown in Fig. 4, the dog is locked in position, because the projecting collar prevents it being lifted up and disengaged from the spindle, while when the collar is rotated until its notch comes opposite the dog E, as illustrated in Fig. 2, the dog enters the said notch, so as to allow it to disengage the teeth in the spindle and it being pulled off the same. While thus engaged, the thumb-piece cannot be depressed.

In the collar J, I form a web, $a''$, Fig. 4, against which a shoulder on the shank $b'$ of the knob bears to prevent said collar from sliding off the annular ring $a'$. The said collar has a bead, $J'$, which may be "milled" or roughened, so as to facilitate its being readily turned when desired.

A modification of the dog E is also shown in Fig. 4, the dog being pivoted similar to the method illustrated in Fig. 2, but constructed without the thumb-piece F and spiral spring G, the dog being in this instance lifted by the nose or projection $g$, as clearly indicated in said Fig. 4.

Having thus fully described my invention, I claim as new and desire to secure to me by Letters Patent of the United States—

1. In door-knob fasteners, the combination, with the knob having the pivoted dog, of the door-plate having the notched movable collar, and the serrated spindle, as and for the object stated.

2. The combination, with the knob of the pivoted dog having the projection $f$, of the spindle C, provided with the serrations H, the plate $B'$, having the annular projection $a'$, and the movable notched collar J upon said annular ring $a'$, the whole being constructed and combined in the manner as and for the purpose stated.

In testimony that I claim the foregoing as my invention I have hereto set my hand in the presence of two subscribing witnesses.

SIMON SCHMAUS.

Attest:
MICHAEL J. STARK,
WM. O. STARK.